United States Patent [19]

Jusa et al.

[11] Patent Number: 6,031,863
[45] Date of Patent: Feb. 29, 2000

[54] WIRELESS LAN SYSTEM

[75] Inventors: Hidehiko Jusa, Kawasaki; Masaaki Shida, Kokubunji, both of Japan

[73] Assignee: Hitachi, Ltd., Tokyo, Japan

[21] Appl. No.: 08/618,116

[22] Filed: Mar. 19, 1996

[30] Foreign Application Priority Data

Mar. 20, 1995 [JP] Japan .................................. 7-060310

[51] Int. Cl.⁷ .......................... H04B 7/26; H04B 1/713; H04L 12/28
[52] U.S. Cl. ...................... 375/202; 375/203; 370/338; 370/350
[58] Field of Search ................... 375/200, 202, 375/203, 356; 370/328, 338, 350; 455/502, 517

[56] References Cited

U.S. PATENT DOCUMENTS

| | | | |
|---|---|---|---|
| 5,394,433 | 2/1995 | Bantz et al. | 375/202 |
| 5,396,541 | 3/1995 | Farwell et al. | 445/403 |
| 5,448,569 | 9/1995 | Huang et al. | 370/332 |
| 5,459,759 | 10/1995 | Schilling | 375/202 |
| 5,483,550 | 1/1996 | Hulbert | 375/202 |
| 5,537,434 | 7/1996 | Persson et al. | 375/202 |
| 5,570,352 | 10/1996 | Poyhonen | 370/330 |
| 5,581,548 | 12/1996 | Ugland et al. | 370/330 |

FOREIGN PATENT DOCUMENTS 7-023467  1/1995  Japan .

OTHER PUBLICATIONS

K.S. Natarajan et al, "Medium Access Control Protocol for Wireless LANs", IEEE P802.11/92–39 Working Document.

*Primary Examiner*—Young T. Tse
*Attorney, Agent, or Firm*—Beall Law Offices

[57] ABSTRACT

The wireless LAN system has an information-carrying capacity which is several times the transmission rate obtained by a single cell. The wireless LAN system properly notifies hopping information even if an error in transmission arises. Hopping control is carried out on a master base-station device 10a and slave base-station devices 10b and 10c based on a synchronizing frame generated from hopping timing of the master base-station device 10a. After completion of the hopping control, each base-station device 10 starts to send hopping information to radio terminals 2 present in the same cell. Radio terminals 2, which are in the same cell as one of the base stations 10, work under the base-station device 10.

26 Claims, 7 Drawing Sheets

FIG. 4

| HOP # \ BASE STATION # | 1 | 2 | 3 | 4 | 5 | |
|---|---|---|---|---|---|---|
| n hop | $f_0$ | $f_{12}$ | $f_{10}$ | $f_1$ | $f_{11}$ | 9a |
| n+1 hop | $f_6$ | $f_5$ | $f_3$ | $f_7$ | $f_4$ | 9b |
| n+2 hop | $f_{12}$ | $f_{11}$ | $f_9$ | $f_0$ | $f_{10}$ | 9c |
| n+3 hop | $f_5$ | $f_4$ | $f_2$ | $f_6$ | $f_3$ | 9d |
| n+4 hop | $f_{11}$ | $f_{10}$ | $f_8$ | $f_{12}$ | $f_9$ | 9e |
| n+5 hop | $f_4$ | $f_3$ | $f_1$ | $f_5$ | $f_2$ | 9f |
| n+6 hop | $f_{10}$ | $f_9$ | $f_7$ | $f_{11}$ | $f_8$ | 9g |
| n+7 hop | $f_3$ | $f_2$ | $f_0$ | $f_4$ | $f_1$ | 9h |
| n+8 hop | $f_9$ | $f_8$ | $f_6$ | $f_{10}$ | $f_7$ | 9i |
| n+9 hop | $f_2$ | $f_1$ | $f_{12}$ | $f_3$ | $f_0$ | 9j |
| n+10 hop | $f_8$ | $f_7$ | $f_5$ | $f_9$ | $f_6$ | 9k |
| n+11 hop | $f_1$ | $f_0$ | $f_{11}$ | $f_2$ | $f_{12}$ | 9l |
| n+12 hop | $f_7$ | $f_6$ | $f_4$ | $f_8$ | $f_5$ | 9m |
| n+13 hop | $f_0$ | $f_{12}$ | $f_{10}$ | $f_1$ | $f_{11}$ | 9n |
| n+14 hop | : | : | : | : | : | |

WIRELESS LAN SYSTEM

FIELD OF THE INVENTION

The present invention relates to a wireless LAN system, and more specifically to a wireless LAN system having one or more base-station devices, wherein each base-station device controls communication timing used for a plurality of communication devices in a centralized manner.

BACKGROUND OF THE INVENTION

Wireless LAN systems are generally known in the art. For example, one is described in IEEE 802.11 Working Document, 11/92-39, entitled "Medium Access Control Protocol for Wireless LANs". This document discloses a wireless LAN system using a frequency hopping/spread spectrum system for changing each carrier frequency based on the same hopping series and hopping cycle or period defined at each cell. In other words, according to this system, the carrier frequencies are hopped in a frame unit.

SUMMARY OF THE INVENTION

The wireless LAN systems known in the prior art do suffer some problems which are overcome by the present invention. For example, when cells are configured in multiple form in the frequency hopping/spread spectrum system as in the prior art, a collision occurs between the carrier frequencies in terms of probability. Since normal communication cannot generally be made when the collision occurs, a reduction in communication efficiency arises for a time interval during which the collision is being made. When a Reed-Solomon series is used as a hop series, for example, one collision occurs during the maximum one cycle between desired two series. When, n cells using a series in which the number of hops is n, are rendered multiple, there is a possibility that the collision occurs during all the respective times.

As in the conventional system, a system for transmitting a carrier frequency to be hopped to next in a communication frame has a problem in that when an error in transmission arises and the corresponding hopping information is not received properly, the subsequent frame cannot be received unless the frame is re-synchronized. This causes additional delay.

An object of the present invention is to provide a base-station device employed for a wireless LAN which does not cause a reduction in communication efficiency even if the cells are provided in multiple form and the total information-carrying capacity is several times the transmission rate obtained by a single cell. This object also entails providing a wireless LAN system.

Another object of the present invention is to provide a base-station device employed in a wireless LAN system capable of properly notifying hopping information even if an error in transmission arises.

To achieve these and other objects of the present invention, a wireless LAN system is provided having a plurality of cells each comprising a base-station device and one or more radio terminals serving under the base-station device. The base-station device and the one or more radio terminals in each cell perform mutual communications using a low-speed frequency hopping/spread spectrum system while frequencies are hopped at regular intervals by the cells and the individual base-station devices in the cells are mutually connected to one another. Each base-station device comprising means for assigning inherent hopping patterns at each cell; means for generating a cue or timing for providing synchronization between base stations from hopping timing; and base station-to-base station synchronism control means for enabling communications between the respective base-station devices in the cells in accordance with the cue or timing generated by the base station-to-base station synchronizing cue generating means to thereby provide hopping synchronization between the base stations.

Each of the base-station devices includes means for communicating with other base-station devices to divide the respective base-station devices in the plurality of cells into a single master base-station device and other slave base-station devices. When the master base-station device is intended to be used as the base-station device, the base station-to-base station synchronism control means of the bass-station device provides the hopping synchronization between the intended base-station device and one or more radio terminals serving under the base-station device in accordance with the cue or timing generated by the base station-to-base station synchronizing cue generating means and notifies a hopping synchronous request to each slave base-station device. When the slave base-station device is intended to be used as the base-station device, the base station-to-base station synchronism control means provides the hopping synchronization between the intended base-station device and the one or more radio terminals serving under the base-station device in response to the hopping synchronous request notified from the master base-station device.

Additionally, when the master base-station device is intended to be used as the base-station device, the base station-to-base station synchronism control means measures the time that has elapsed before the occurrence of the next hopping timing for the intended base-station device in response to the cue generated by the base station-to-base station synchronizing cue generating means and sets it as a synchronous correction time for the intended base-station device. When a time corresponding to the difference between the hopping interval and the synchronous correction time for the intended base-station device has elapsed after completion of a predetermined number of hops for initiation of synchronous control, the base station-to-base station synchronism control means performs the hopping from the leading frequency of the inherent hopping pattern for the corresponding cell to which the intended base-station device belongs. When the slave base-station device is intended for the base-station device, the base station-to-base station synchronism control means measures the time that has elapsed before the occurrence of the next hopping timing for the intended base-station device in response to the hopping synchronous request notified from the master base-station device and sets it as a synchronous correction time for the intended base-station device. When a time corresponding to the difference between the hopping interval and the synchronous correction time for the intended base-station device has elapsed after completion of the predetermined number of hops for initiation of the synchronous control, the base station-to-base station synchronism control means performs the hopping from the leading frequency of the inherent hopping pattern for the corresponding cell to which the intended base-station device belongs.

Furthermore, preferably, the base station-to-base station synchronism control means provides notification of the hopping information including the synchronous correction time and the number of hops for initiation of the synchronous control to the one or more radio terminals in the cell to which the intended base-station device belongs. Each of the radio terminals measures the time that has elapsed before the occurrence of the next hopping timing and sets it as a synchronous correction time for the intended base-station device. When a time corresponding to the difference between the hopping interval and the synchronous correction time has elapsed after completion of the number of hops for initiation of synchronous control, each of the radio terminals performs the hopping from the leading frequency of the inherent hopping pattern for the corresponding cell to which the intended base-station device belongs. The hopping information may preferably be notified plural times.

According to the wireless LAN system of the present invention, since the hopping synchronization is provided between the base-station devices at regular intervals even if the hopping timing for each cell is shifted with the lapse of time, no collision occurs between the carrier frequencies employed in the individual cells.

The base-station device brought to or intended to work as the master base-station device generates the cue for providing synchronization between the base stations from the hopping timing. After a predetermined time has elapsed since this cue, the master base-station device and the one or more radio terminals serving under the master base-station device resume hopping from the leading frequency of the hopping pattern assigned to the corresponding cell to which they belong. Furthermore, the master base-station device notifies the hopping synchronous request to its corresponding slave base-station device in response to the cue. After a predetermined time has elapsed since the reception of the hopping synchronous request, the slave base-station device and the one or more radio terminals serving under the slave base-station device similarly resume hopping from the leading frequency of the hopping pattern assigned to the corresponding cell to which they belong.

Thus, the shift in hopping timing at the heads of the hopping patterns between the cells corresponds only to a delay in communication of the hopping synchronous request upon hopping synchronization. Therefore, the same frequency is not used simultaneously between the cells so long as the number of cells is set to about half the number of hopping frequencies and the hopping patterns assigned to the cells are set so that the hopping timings having the same frequency are sufficiently shifted between the cells.

Further, the hopping information having the same contents is notified plural times from the corresponding base-station device to the one or more radio terminals serving under the base-station device. Thus, even if the hopping information cannot be properly received during several carrier frequencies due to an error in transmission, it can be properly received by the remaining carrier frequencies, thereby making it possible to prevent a failure in reception of the hopping information.

These and other objects, features and advantages of the present invention will become more apparent in view of the following detailed description of the preferred embodiments.

BRIEF DESCRIPTION OF THE DRAWINGS

FIG. 4 illustrates hopping patterns.

DETAILED DESCRIPTION OF THE PREFERRED EMBODIMENTS

Figure 1:
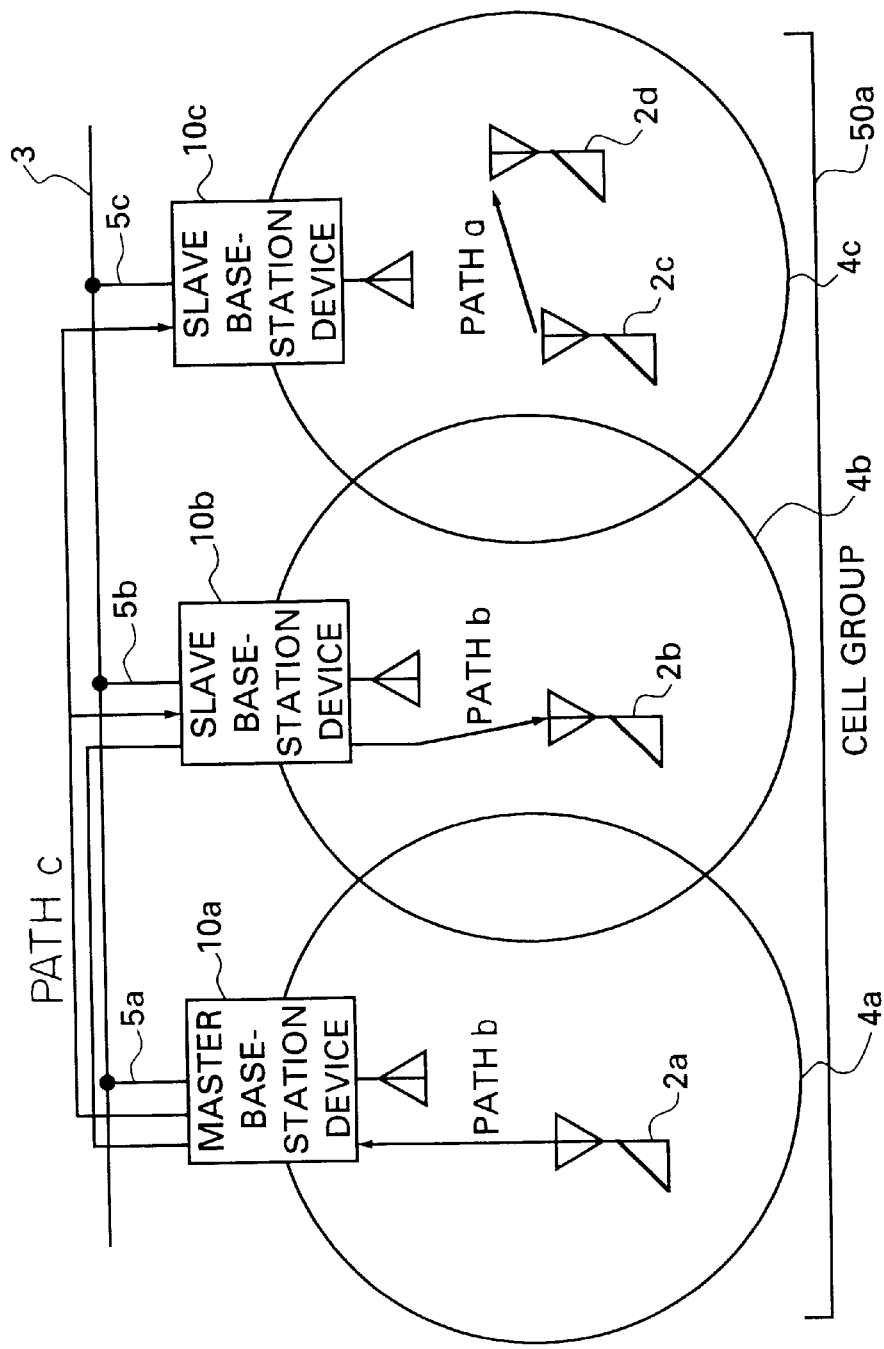
FIG. 1 illustrates the overall structure of a wireless LAN system according to one embodiment of the present invention.

A preferred embodiment of the present invention will hereinafter be described with reference to the accompanying drawings. FIG. 1 is an overall structural view showing one embodiment of a wireless LAN system according to the present invention. The wireless LAN system shown in FIG. 1 includes base-station devices (10a, 10b and 10c), radio terminals (2a, 2b, 2c and 2d) and a cable or wire LAN 3 for providing communications between the base-station devices (10a, 10b and 10c). The base-station devices 10a, 10b and 10c are wire-connected to the wire LAN 3 by connectors 5a, 5b and 5c, respectively. Reference symbols 4a, 4b and 4c indicate cells corresponding to regions for managing the base-station devices 10a, 10b and 10c, respectively. An overall system, which consists of the cells 4a, 4b and 4c, is called a "cell group 50a". The base-station devices 10 and the radio terminals 2 in the cells 4 perform intercommunications using a low-speed frequency hopping/spread spectrum system for varying a carrier frequency in a predetermined cycle that is longer than a symbolic period or cycle.

When two radio terminals exist within the same cell, for example cell 4c, as in the case of data communications made between the radio terminals 2c and 2d, data communications between the two radio terminals 2c and 2d are made using a path a. When the radio terminals respectively exist within the different cells 4a and 4b as in the case of data communications made between the radio terminals 2a and 2b, data communications between the two radio terminals are carried out using path b.

In the wireless LAN system according to the present embodiment, the individual cells 4 periodically vary or hop their carrier frequencies. In the present embodiment, the wireless LAN system will be described under the condition that a hopping period or cycle of each carrier frequency is 100 ms and the number of hops or hoppings is 13. Given that the carrier frequencies which are different from each other are used among the cells 4, synchronization control between base stations is carried out.

Namely, in this example, a plurality of base-station devices 10a, 10b and 10c are divided into a single master base-station device 10a and two slave base-station devices 10b and 10c. Hopping control for the master base-station device 10a and the slave base-station devices 10b and 10c is exercised based on a cue or timing generated from hopping timing for the master base-station device 10a. After completion of the hopping control, each of the base-station devices 10 starts to notify hopping information to its corresponding radio terminal 2 in each cell 4. The master and slave base-station devices execute communications among one another and perform settings based on the relationship between the magnitudes of MAC addresses.

Incidentally, it is noted that the hopping control for the slave base-station devices 10b and 10c uses a synchronizing frame. The notification of the synchronizing frame is performed through the wire LAN 3 (path c). The notification of the synchronizing frame is not necessarily limited to the wire LAN 3. This notification may be executed through a dedicated line or by wireless. The base station-to-base station synchronous control will be described in detail later.

Figure 2:
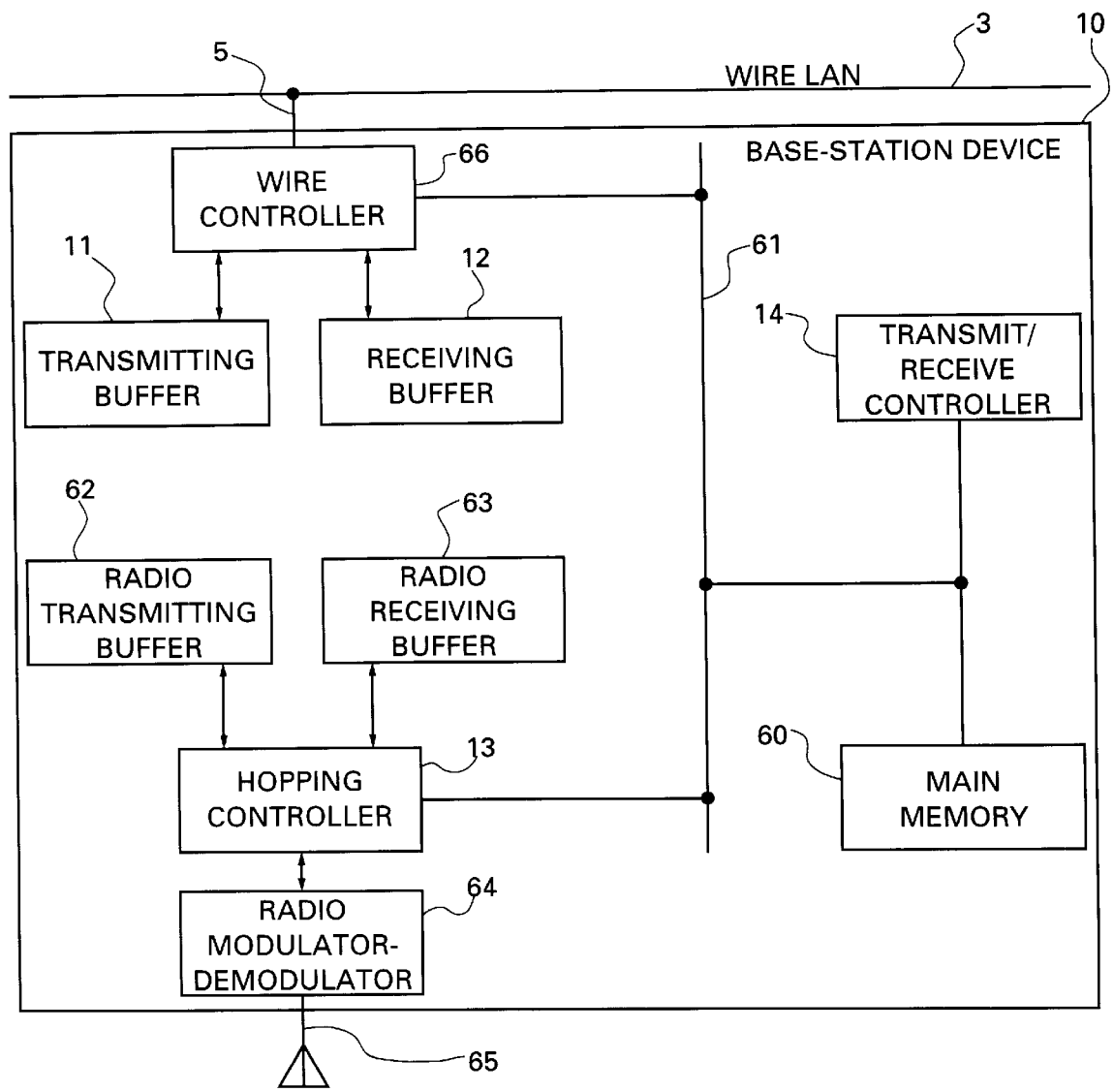
FIG. 2 illustrates the structure of a base-station device employed in the embodiment of the present invention.

FIG. 2 illustrates the configuration of the base-station device 10. The base-station device 10 includes a transmit/receive controller 14, a main memory 60, a CPU bus 61, a transmitting buffer 11, a receiving buffer 12, a wire controller 66, a radio transmitting buffer 62, a radio receiving buffer 63, a hopping controller 13, a radio modulator-demodulator 64 and an antenna 65. The base-station device 10 is connected to the wire LAN 3 through a connector 5.

The wire controller 66 controls the transmission and reception of data to and from the wire LAN 3. The hopping controller 13 controls the transmission and reception of data to and from its corresponding radio zone. The transmit/receive controller 14 performs transmit/receive control of identification of a frame or the like. The transfer of a control signal (such as a transmit instruction signal to be described later) among the transmit/receive controller 14, the hopping controller 13 and the wire controller 66 is performed through the CPU bus 61.

The radio modulator-demodulator 64 modulates a frame sent from the hopping controller 13 and frequency-converts the frequency of the frame into 2.4 GHz. Thereafter, the radio modulator-demodulator 64 transmits it from the antenna 65. Furthermore, the radio modulator-demodulator 64 frequency-converts a frame received by the antenna 65 into a base band and demodulates it. Thereafter, the radio modulator-demodulator 64 sends it to the hopping controller 13.

Figure 8:
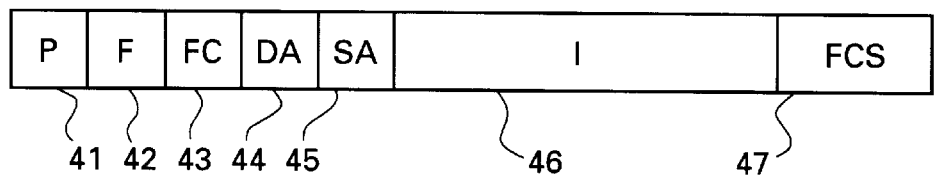
FIG. 8 illustrates a frame format employed in a radio zone.

Communications between radio zones are performed on a frame format basis as shown in FIG. 8. The frame format, which will be described later, is received and processed by the base-station device 10 as follows. The frame received by the antenna 65 is temporarily stored in the radio receiving buffer 63 through the radio modulator-demodulator 64 and the hopping controller 13. The hopping controller 13 identifies a user frame and a control frame to be relayed to the wire LAN 3. When the user frame to be relayed from the radio receiving buffer 63 to the wire LAN 3 is identified, it is transmitted via the hopping controller 13, the CPU bus 61 and the wire controller 66 and is then converted into a frame format (e.g., a frame based in IEEE802.3 Working Document or in Ethernet V 2.0) to be used on the wire LAN 3, which is in turn stored in the transmitting buffer 11. Thereafter, the transmitting buffer 11 sends the frame format stored therein onto the wire LAN 3 via the wire controller 66 and the connector 5 as soon as the wire LAN 3 is brought into an vacant state. When the control frame is identified, the hopping controller 13 fetches necessary information from the corresponding control frame and thereafter abolishes it. When neither of the user and control frames is identified, the hopping controller 13 abandons the corresponding frame.

On the other hand, communications on the wire LAN 3 are performed based on the aforementioned frame format used on the wire LAN 3. The frame format is received and processed by the base-station device 10 in the following manner. A frame sent from the wire LAN 3 is temporarily stored in the receiving buffer 12 through the connector 5 and the wire controller 66. Thereafter, the frame outputted from the receiving buffer 12 is stored in the radio transmitting buffer 62 via the wire controller 66, the CPU bus 61 and the hopping controller 13. At this time, the frame is converted into the frame format shown in FIG. 8 and is used for each radio zone. The transmit/receive controller 14 identifies a wire user frame and a wire management frame (e.g., synchronizing frame) relayed to each radio zone.

When the wire user frame to be relayed to its corresponding radio zone is identified, the transmit/receive controller 14 sends the transmit instruction signal to the hopping controller 13 through the CPU bus 61. Next, the radio transmitting buffer 62 sends the wire user frame to the corresponding radio zone through the hopping controller 13, the radio modulator-demodulator 64 and the antenna 65. On the other hand, when the wire management frame is identified, the transmit/receive controller 14 causes the main memory 60 to store the frame sent from the radio transmitting buffer 62 via the CPU bus 61. Furthermore, the transmit/receive controller 14 fetches necessary information from the corresponding frame and thereafter abolishes it.

A process for transmitting the wire management frame will now be described. The transmit/receive controller 14 generates a wire management frame within the main memory 60 and converts it into a frame format used on the wire LAN 3 via the CPU bus 61 and the wire controller 66 after which it is stored in the transmitting buffer 11. Thereafter, the stored frame format is sent from the transmitting buffer 11 to the wire LAN 3 through the wire controller 66 and the connector 5 as soon as the wire LAN 3 is brought into the vacant state.

A process for transmitting the control frame to its corresponding radio zone will now be described. The hopping controller 13 generates a desired control frame in the form of the frame format, shown in FIG. 8, and used for the radio zone, within the radio transmitting buffer 62. In response to a transmit instruction issued from the hopping controller 13, the radio transmitting buffer 62 sends the control frame to its corresponding radio zone through the hopping controller 13, the radio modulator-demodulator 64 and the antenna 65.

Figure 3:
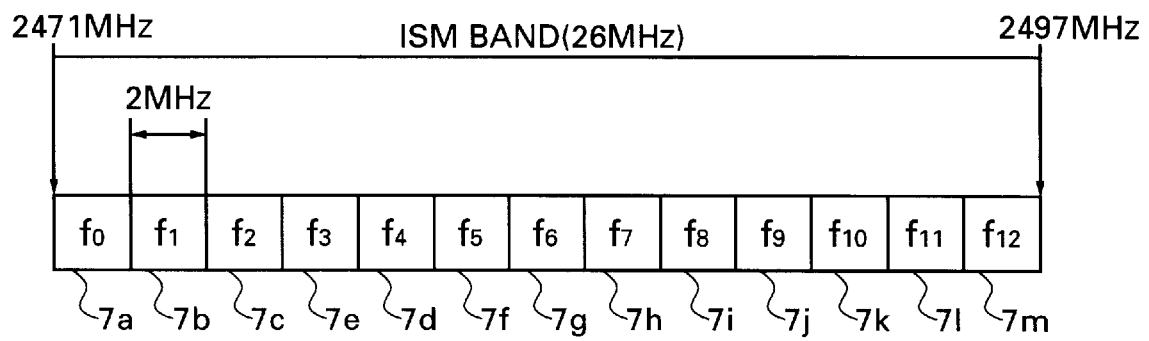
FIG. 3 illustrates assignments of carrier frequencies.

FIG. 3 shows assignments of carrier frequencies employed according to a preferred embodiment of the wireless LAN system. An ISM band 6 having a 26 MHz-bandwidth of frequencies from 2471 MHz to 2497 MHz assigned for a spread spectrum system is used in the present system. The ISM band 6 is divided into thirteen subchannels 7a through 7m each having a 2 MHz-width. Thus, the center frequency fi of each carrier frequency becomes 2472+2i (i=0, . . . , 12) MHz. The base-station devices 10 and the radio terminals 2 hop through the individual subchannels in accordance with predetermined hopping patterns.

FIG. 4 illustrates one example of hopping patterns. This example shows carrier frequencies 9a through 9n produced at every base-station devices 8 where five base-station devices 10 perform hopping simultaneously. For example, a base station #1 starts hopping from the leading carrier frequency f0 and returns to the original carrier frequency f0 at a thirteenth hop. The base station #1 hereafter repeats this processing. The sequence of hopping employed in each of the other base stations #2 through #5 is identical to the sequence of hopping employed in the base station #1. However, carrier frequencies at which the base stations #2 through #5 start hopping are different from the carrier frequency at which the base station #1 starts hopping. A plurality of hopping patterns are prepared and desired patterns are designated or specified in advance and used at each cell group 50. Any one of the patterns (base stations #1 through #5) employed in each base-station device 10 is selected in advance according to the relationship between the magnitudes of the MAC addresses employed in each base-station device 10, for example.

Even when thirteen cells are rendered multiple as the maximum number of cells to be provided in multiple form when thirteen carrier frequencies are used, the probability of collision among these frequencies can theoretically be set to 0. However, since it is extremely difficult to simultaneously change the carrier frequencies employed in the individual base-station devices 10 as a practical matter, the number of cells to be rendered multiple may be reduced to about half the number of carrier frequencies to be used. By doing so, carrier frequencies employed in an n hop may be f0, f12, f10, f1 and f11, whereas carrier frequencies employed in an n+1 hop may be f6, f5, f3, f7 and f4, even if the switching between the carrier frequency employed in the respective base-station devices 10 is slightly shifted in time. This is shown by way of example in FIG. 4. Therefore, the carrier frequencies do not overlap one another and no collisions occur between the respective cells 4.

Figure 5:
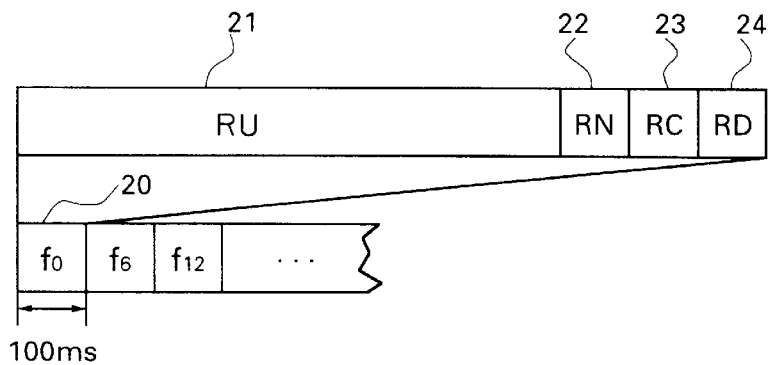
FIG. 5 illustrates the contents of a hopping period.

FIG. 5 shows the contents of one hopping cycle or period 20 employed in a radio zone of the present wireless LAN system. The one hopping cycle corresponds to 100 ms and consists of a user frame region RU21, a non-transmission region RN22, a control frame region RC23 and a dummy region RD24.

In the user frame region RU21, user data is transmitted and received using a user frame. The non-transmission region RN22 is of a region provided to avoid the collision between the user frame transmitted in the user frame region RU21 and a control frame transmitted in the next control frame region RC23. No user frame is transmitted contemporaneously with the non-transmission region RN22. The control frame region RC23 is a region for sending a control frame including information required for performing hopping control which will be described later.

Each base-station device 10 sends this control frame to its corresponding radio terminal 2 in each cell 4 to perform hopping control. The dummy region RD24 is a region for ensuring the time interval required to switch between synthesizers. A process for switching between the carrier frequencies is executed in this region.

FIG. 8 illustrates the frame format employed in each radio zone. A region P41 is a dummy region for providing a time interval to a physical layer to establish and maintain synchronization relative to the physical layer. A region F42 is disposed subsequently to the region P41 and indicates the substantial head of effective information in the present frame. A region FC43 is a frame control region in which control information for identifying the user frame and the control frame is included.

When the base-station device 10 notifies hopping information to the corresponding radio terminal 2 serving thereunder, it sets the region FC43 as the control frame and provides communication in this state. A region DA44 shows a destination address and a region SA45 indicates an origin-of-transmission (source) address. A region 146 represents an information portion. A region FCS47 shows a frame check sequence and is used to detect an error in the entirety of the frame excluding the region P41, using a CRC code indicative of an error detection code.

The base station-to-base station synchronizing control will now be described with reference to FIGS. 6 and 7. First, it should be noted that a master base-station device 10a utilizes the pattern for the base station #1 in the hopping patterns shown in FIG. 4, whereas a slave base-station device 10b makes use of the pattern for the base station #2.

Figure 6:
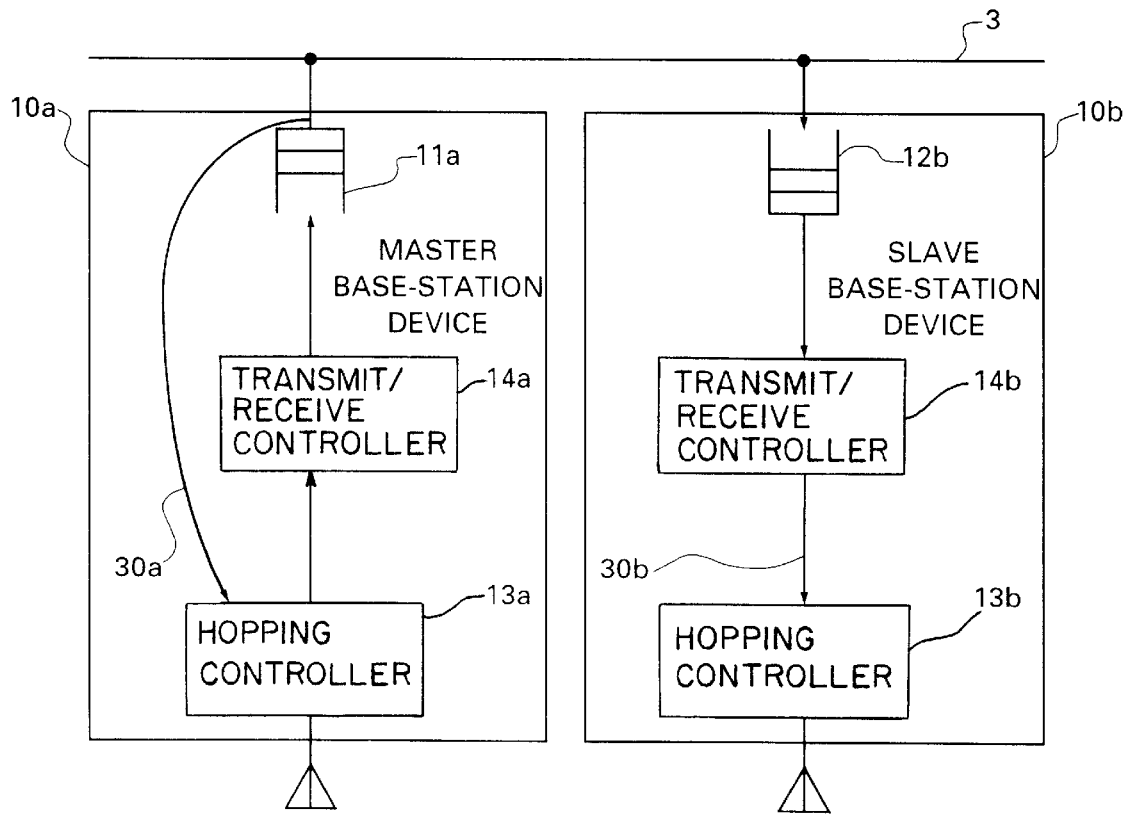
FIG. 6 illustrates the timing provided to make a synchronism correction request.

As shown in FIG. 6, a hopping controller 13a of the master base-station device 10a provides notification of the timing for sending the head of the initial carrier frequency f0 of the hopping patterns to a transmit/receive controller 14a. The master base-station device 10a does not perform hopping control over a radio terminal 2 in a cell 4a which serves under the master base-station device 10a at this time. Since the hopping cycle is 100 ms and the number of hops is equal to thirteen in the present embodiment, there is a time interval for notifying the timing to the transmit/receive controller 14a which is 100 ms×13=1.3 s.

The transmit/receive controller 14a counts the number of notifications and causes a transmitting buffer 11a to place a synchronizing frame in a queuing state each time the number of notifications reaches a predetermined number. The number of notifications is determined based on the accuracy of a clock employed in the base-station device 10 and the radio terminal 2 and the magnitude of shifts in hopping timing that are allowable between the individual cells 4. If a clock having an accuracy of a few ppm (one millionth), for example, is used and shifts in hopping timing between the respective cells 4 are respectively allowed to 50 ms or so, then a time interval required to transmit the synchronizing frame may be set approximately once every two to three hours. Of course, this time interval is indicated by way of example only. However, since the synchronizing frame is occasionally not received due to the fact that a receiving buffer 12b of the slave base-station device 10b is filled to capacity, the time interval referred to above may be set to a fraction of the time interval, e.g., substantially once every 30 minutes in consideration of a failure in reception.

The master base-station device 10a outputs a synchronism correction request 30a to the hopping controller 13a when the synchronizing frame has been transmitted from the transmitting buffer 11a. For example, the completion of the transmission of the synchronizing frame may be used as a momentum or cue. The hopping controller 13a measures a time (hereinafter called "synchronous correction time") xa from the occurrence of the synchronous correction request 30a to the occurrence of the next hopping timing as shown in FIG. 7.

Figure 7:
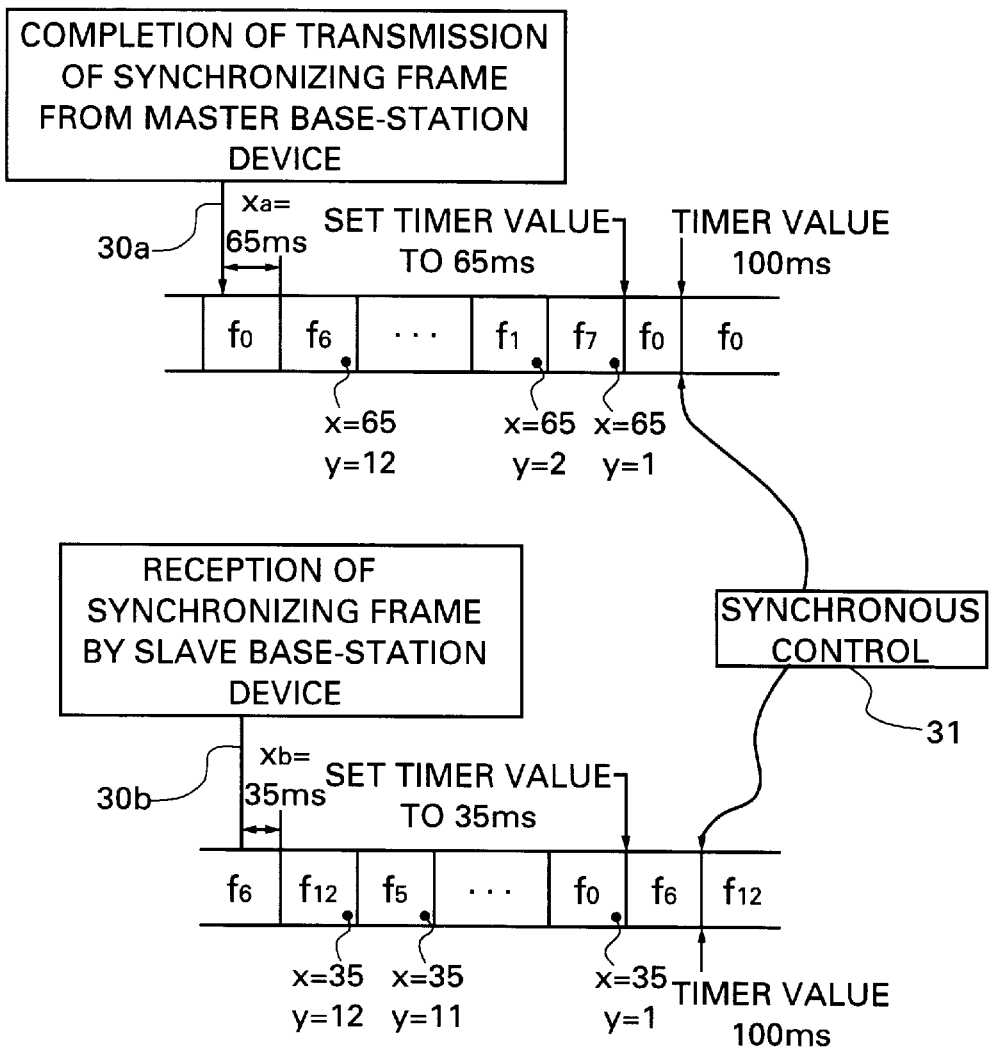
FIG. 7 illustrates the control for providing synchronism between base stations.

FIG. 7 illustrates a case in which the synchronous correction time xa=65 ms. Next, the hopping controller 13a sets the synchronous correction time xa, a hopping number y, (hereinafter called "the number of hops used for the initiation of synchronous control") which is necessary by the time the synchronous control is actually performed, and a hopping pattern identifier to a control frame of the next carrier frequency f6 subsequent to the measurement of the synchronous correction time xa, as hopping information and provides notification of this information to its corresponding radio terminal 2 in the cell 4a by radio communication. At this time, the value of y is represented as a number obtained by subtracting 1 from the number of hops. The cue or time at which the transmission of the synchronizing frame is completed is not necessarily limited to the time when the synchronizing frame is sent. For example, queuing effected on the transmitting buffer 11a can be used in place of the time when its transmission is completed.

On the other hand, the master base-station device 10a shown in FIG. 6 transmits the synchronizing frame to the slave base-station device 10b by group broadcasting via the wire LAN 3. Only an identifier capable of identifying whether the synchronizing frame corresponds to a frame used for base station-to-base station control, is set to the synchronizing frame as information. In the slave base-station device 10b, the synchronizing frame is stored in a receiving buffer 12b. A transmit/receive controller 14b of the slave base-station device 10b decodes the contents stored in the receiving buffer 12b. When the transmit/receive controller 14b identifies the result of decoding as the synchronizing frame, the transmit/receive controller 14b outputs a synchronous correction request 30b to a hopping controller 13b of the slave base-station device 10b with this as a momentum or cue. The hopping controller 13b measures a synchronous correction time xb as shown in FIG. 7 in the same manner as described above. FIG. 7 illustrates a case in which the synchronous correction time xb=35 ms. The hopping controller 13b sets the synchronous correction time xb, the number of hops y used for the initiation of synchronous control and a hopping pattern identifier to a control frame as hopping information and provides notification of this information to its corresponding radio terminal 2 in a cell 4b by radio communication. The respective base-station devices 10 and their radio terminals 2 respectively have table information in which hopping patterns indicative of the sequence of hopping are associated with the previous hopping pattern identifiers. Further, they are controlled so as to recognize the hopping patterns from a received hopping pattern identifier and this table information.

When the individual base-station devices 10 and their radio terminals 2 are already in normal operation, they are controlled as follows: The individual base-station devices 10 and radio terminals 2 in the cells 4, which have received the hopping information therein and serve under the base-station devices 10, start to set a timer value corresponding to a hopping interval from the value of a synchronous correction time x at the head of a carrier frequency subsequent to a carrier frequency in which the number of hops y for the initiation of the synchronous control is 1. When the timer value coincides with the value (100 ms in the present embodiment) of a hopping interval employed in the present system, synchronous control 31 is executed again from the head carrier frequency of the hopping patterns. Although the head f0 of a carrier frequency on the master base-station device 10a side does not completely coincide with the head f12 of a carrier frequency on the slave base-station device 10b side as shown in FIG. 7, no problem arises as long as the number of cells to be provided in multiple form is reduced to about half the number of the carrier frequencies to be used. It is assumed that the hopping information cannot be properly received over a few number of carrier frequencies due to a temporary transmission error. However, no problem arises because the hopping information is transmitted several times (a total of twelve times in present embodiment).

On the other hand, when the individual base-station devices 10 and their radio terminals 2 are not brought into normal operating states, they are controlled as follows. Since hopping timing is independently provided for the hopping controller 13 in each of the base-station devices 10 simultaneously with power-up, the base-station device 10 performs the aforementioned hopping control in accordance with the hopping timing. Simultaneously with power-up, each of the radio terminals 2 is brought into a listening state in which only the reception is made at a fixed carrier frequency f. When one base-station device 10 for managing a cell 4 to which the corresponding radio terminal 2 belongs, transmits the carrier frequency f, the corresponding radio terminal 2 reads a hopping identifier from the above hopping information and thereby determines a hopping pattern to start hopping.

Figure 9:
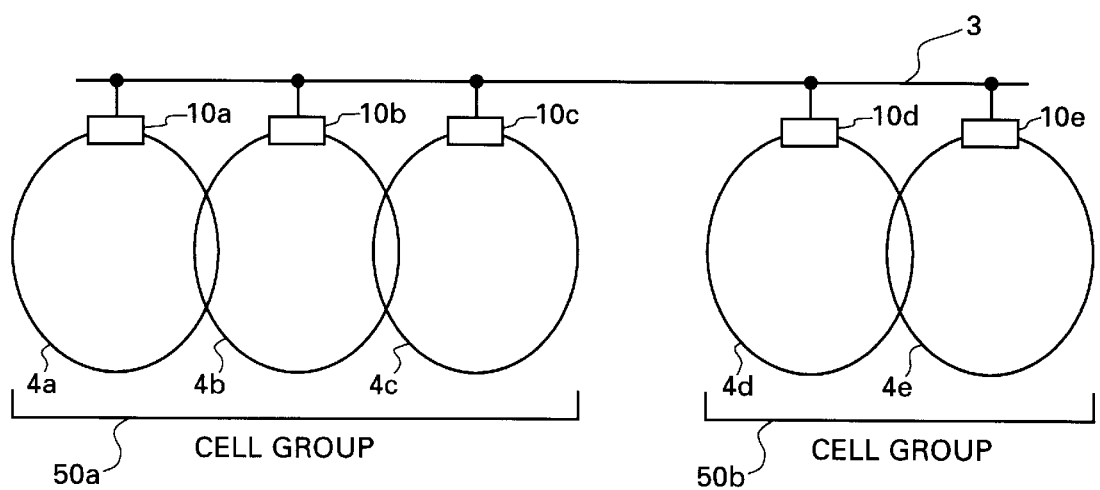
FIG. 9 illustrates a system in which a plurality of cell groups are connected to one another.

A description has been made above of the system wherein one cell group 50a is connected to the wire LAN 3 as shown in FIG. 1. When, for example, two cell groups 50 are sufficiently distant from each other and they are provided at positions where they do not interfere with each other in terms of radio, there is a case in which a plurality of cell groups 50a and 50b are connected to a wire LAN 3 as shown in FIG. 9. In the system shown in FIG. 9, each of the cell groups 50a and 50b does not need to perform synchronous control between base stations. A single master base-station device 10a may perform base station-to-base station synchronous control over the entire system. Thus, a synchronizing frame is not transmitted over the wire LAN 3, resulting in an increase in communication efficiency.

According to the wireless LAN system of the present invention, other cells are kept in hopping synchronism in accordance with the hopping timing of the master base-station device and hence the carrier frequencies to be used for the individual cells are prevented from colliding with one another. Therefore, the efficiency of communications is not reduced even if the cells are rendered multiple. As a result, a total information-carrying capacity which is several times the transmission rate obtained by a single cell, can be obtained.

Furthermore, since the hopping information having the same contents is notified plural times to the radio terminal serving under each of the base-station devices upon radio transmission of the hopping information from the base-station device to the radio terminal, the hopping information can be properly notified to the corresponding radio terminal even if an error in transmission arises.

While the present invention has been described above in connection with the preferred embodiments disclosed, one of ordinary skill in the art would be enabled by this disclosure to make various modifications to these embodiments and still be within the scope and spirit of the present invention as recited in the appended claims.

What is claimed is:

1. A wireless LAN system having a plurality of cells each comprising a base-station device and one or more radio terminals serving under the base-station device and wherein said base-station device and said one or more radio terminals in each of said plurality of cells perform mutual communications using a low-speed frequency hopping/spread spectrum system while frequencies are hopped at regular intervals by said cells and individual base-station devices in said cells are mutually connected to one another, each base-station device comprising:

means for assigning inherent hopping patterns at each cell;

means for generating a cue for providing synchronization between base-stations devices from a hopping timing;

synchronism control means for enabling communications between the respective base-station devices in the cells in accordance with the cue, generated by said means for generating the cue, thereby providing hopping synchronization between the base-station devices:

wherein each base-station device further comprises means for communicating with other base-station devices to divide said respective base-station devices in said plurality of cells into a single master base-station device and base-station devices other than said master base-station into slave base-station devices;

wherein with respect to said master base-station device, said synchronism control means of said master base-station device provides the hopping synchronization between said master base-station device and said one or more radio terminals serving under said master base-station device in accordance with the cue generated by said means for generating the cue and notifies a hopping synchronous request to said each slave base-station device; and wherein with respect to said slave base-station device, said synchronism control means provides the hopping synchronization between said slave base-station device and said one or more radio terminals serving under said slave base-station device in response to the hopping synchronous request notified from said master base-station device.

2. A wireless LAN system according to claim 1, wherein said synchronism control means of said master base-station device measures a time that has elapsed before the occurrence of the next hopping timing for said master base-station device in accordance with the cue generated by said means for generating the cue and sets it as a synchronous correction time for said master base-station device, and when a time corresponding to the difference between the hopping interval and the synchronous correction time for said master base-station device has elapsed after completion of a predetermined number of hops, said synchronism control means performs the hopping from the leading frequency of the inherent hopping pattern for said corresponding cell to which said master base-station device belongs, and;

said synchronism control means of said slave base-station device measures a time that elapsed before the occurrence of the next hopping timing for said slave base-station device in response to the hopping synchronous request notified from said master base-station device and sets it as a synchronous correction time for said slave base-station device, and when a time corresponding to the difference between the hopping interval and the synchronous correction time has elapsed after completion of the predetermined number of hops, said synchronism control means performs the hopping from the leading frequency of the inherent hopping pattern for said corresponding cell to which said slave base-station device belongs.

3. A wireless LAN system according to claim 2, wherein said synchronism control means sends hopping information, including the synchronous correction time and a synchronous control start hopping number indicative of the number of hops counted before the hopping synchronization is provided, to said one or more radio terminals in said cell to which said master base-station device belongs; and when each of said radio terminals receives the hopping information and the number of hops for initiation of the synchronous control indicates a hopping synchronization at the next hopping, said radio terminal performs the hopping from the leading frequency of the inherent hopping pattern for said cell to which said master base-station device belongs, when a time corresponding to the difference between the hopping interval and the synchronous correction time for said master base-station device has elapsed from the head of the next hopping.

4. A wireless LAN system according to claim 3, wherein said synchronous control means notifies the hopping information to said one or more radio terminals in said cell to which said master base-station device belongs a plural number of times.

5. A wireless LAN system according to claim 2, wherein said synchronism control means sends hopping information, including the synchronous correction time and a synchronous control start hopping number indicative of the number of hops counted before the hopping synchronization is provided, to said one or more radio terminals in said cell to which said slave base-station device belongs; and when each of said radio terminals receives the hopping information and the number of hops for initiation of the synchronous control indicates a hopping synchronization at the next hopping, said radio terminal performs the hopping from the leading frequency of the inherent hopping pattern for said cell to which said slave base-station device belongs, when a time corresponding to the difference between the hopping interval and the synchronous correction time for said intended base-station device has elapsed from the head of the next hopping.

6. A wireless LAN system according to claim 5, wherein said synchronous control means notifies the hopping information to said one or more radio terminals in said cell to which said slave base-station device belongs a plural number of times.

7. A wireless LAN system having a plurality of cells each comprising a base-station device and one or more radio terminals serving under the base-station device and wherein said base-station device and said one or more radio terminals in each of said plurality of cells perform mutual communications using a low-speed frequency hopping/spread spectrum system while frequencies are hopped at regular intervals by said cells and individual base-station devices in the cells are mutually connected to one another, wherein each base-station device comprises:

means for assigning inherent hopping patterns to said cell to which the corresponding base-station device belongs, at said each cell:

means for generating a cue for providing synchronization between base-station devices from a hopping timing;

base-station-device-to-base-station devices synchronism control means for enabling communications between the respective base-station devices in said other cells in accordance with the cue generated by said means for generating the cue to thereby provide hopping synchronization between the base-station devices:

wherein each of said base-station devices further comprises means for communicating with other base-station devices to divide said respective base-station devices in said plurality of cells into a single master base-station device and at least one slave base-station device;

wherein in a cell containing said master base-station device, said base-station device-to-base-station device synchronism control means provides the hopping synchronization between said master base-station device and said one or more radio terminals serving under said master base-station device in accordance with the cue generated by said means for generating the cue and notifies a hopping synchronous request to said at least one slave base-station device; and wherein in a cell containing said at least one slave base-station device, said base-station device-to-base-station device synchronism control means provides the hopping synchronization between said slave base-station device and said one or more radio terminals serving under said slave base-station device in response to the hopping synchronous request notified from said master base-station device.

8. A wireless LAN system according to claim 7, wherein said base-station device-to-base-station device synchronism control means of said master base-station device measures a time that elapsed before the occurrence of the next hopping timing of said master base-station device in accordance with the cue generated by said means for generating the cue and sets it as a synchronous correction time for said master base-station device, and when a time corresponding to the difference between the hopping interval and the synchronous correction time has elapsed after completion of a predetermined number of hops for initiation of synchronous control, said base-station device-to-base-station device synchronism control means performs hopping from the leading frequency of the inherent hopping pattern for said corresponding cell to which said master base-station device belongs.

9. A wireless LAN system according to claim 8, wherein said base-station device-to-base-station device synchronism control means sends hopping information, including the synchronous correction time and the number of hops for initiation of the synchronous control to said one or more radio terminals in said cell to which said master base-station device belongs, a plural number of times.

10. A wireless LAN system according to claim 7, wherein said base-station device-to-base-station device synchronism control means of said slave base-station device measures a time that elapsed before the occurrence of the next hopping timing for said slave base-station device in response to the hopping synchronous request notified from said master base-station device and sets it as a synchronous correction time, and when a time corresponding to the difference between the hopping interval and the synchronous correction time has elapsed after completion of a predetermined number of hops for initiation of synchronous control, said base-station device-to-base-station device synchronism control means performs the hopping from the leading frequency of the inherent hopping pattern for said corresponding cell to which said slave base-station device belongs.

11. A wireless LAN system according to claim 10, wherein said base-station device-to-base-station device synchronism control means sends hopping information, including the synchronous correction time and the number of hops for initiation of the synchronous control to said one or more radio terminals in said cell to which said slave base-station device belongs, a plural number of times.

12. A method of controlling base-station devices employed in a wireless LAN system having a plurality of cells each comprising the base-station device and one or more radio terminals serving under the base-station device and wherein said base-station device and said one or more radio terminals in each cell perform mutual communications using a low-speed frequency hopping/spread spectrum system while frequencies are hopped at regular intervals by said cells and individual base-station devices in the cells are mutually connected to one another, said method causing said base-station device to perform the steps of:

communicating with other base-station devices to divide said respective base-station devices in said plurality of cells into a single master base-station device and at least one slave base-station device, and assigning inherent hopping patterns at said each cell;

wherein if the base-station device is said master base-station device, generating a cue for providing synchronization between base-station devices from hopping timing, providing the hopping synchronization between said master base-station device and said one or more radio terminals serving under said master base-station device in accordance with the generated cue for providing synchronization and notifying a hopping synchronous request to said at least one slave base-station device; and wherein if said base-station device is said at least one slave base-station device, providing the hopping synchronization between said slave base-station device and said one or more radio terminals serving under said slave base-station device in response to the hopping synchronous request notified from said master base-station device.

13. A method according to claim 12, wherein said hopping synchronous request includes hopping information including a synchronous correction time and a synchronous control start hopping number indicative of the number of hops counted before the hopping synchronization is provided, and when each of said radio terminals receives the hopping information and the number of hops for initiation of the synchronous control indicates a hopping synchronization at the next hopping, said radio terminal performs the hopping from the leading frequency of the inherent hopping pattern for said cell to which said master base-station device belongs, when a time corresponding to the difference between the hopping interval and the synchronous correction time for said master base-station device has elapsed from the head of the next hopping.

14. A method according to claim 13, wherein said hopping information is provided to said one or more radio terminals in said cell to which said master base-station device belongs a plural number of times.

15. A method according to claim 13, wherein said hopping synchronous request includes hopping information including a synchronous correction time and a synchronous control start hopping number indicative of the number of hops counted before the hopping synchronization is provided, and when each of said radio terminals receives the hopping information and the number of hops for initiation of the synchronous control indicates a hopping synchronization at the next hopping, said radio terminal performs the hopping from the leading frequency of the inherent hopping pattern for said cell to which said slave base-station device belongs, when a time corresponding to the difference between the hopping interval and the synchronous correction time for said slave base-station device has elapsed from the head of the next hopping.

16. A method according to claim 15, wherein said hopping information is provided to said one or more radio terminals in said cell to which said slave base-station device belongs a plural number of times.

17. In a wireless LAN system having one or more cells each comprising a base-station device and one or more radio terminals serving under the base-station device and wherein said base-station device and said one or more radio terminals in each cell perform mutual communications using a low-speed frequency hopping/spread spectrum system while frequencies are hopped at regular intervals by said cells based on inherent hopping patterns, said base-station device comprising:

means for generating a cue for providing hopping synchronization; and hopping synchronism control means for providing the hopping synchronization between said corresponding base-station device and said one or more radio terminals serving under said corresponding base-station device, based on the cue generated by said means for generating the cue for providing hopping synchronizing;

said hopping synchronism control means comprising:
hopping synchronizing means for measuring a time that elapsed before the occurrence of the next hopping timing of said corresponding base-station device in accordance with the cue generated by said hopping synchronization generating means and setting it as a synchronous correction time, and performing the hopping from the leading frequency of the inherent hopping pattern for said cell to which said corresponding base-station device belongs, when a time corresponding to the difference between the hopping interval and the synchronous correction time for said corresponding base-station device has elapsed after completion of a predetermined number of hops for initiation of synchronous control; and means for notifying hopping information including the synchronous correction time and the number of hops for initiation of the synchronous control to said one or more radio terminals in said cell to which said corresponding base-station device belongs; and when each radio terminal receiving the hopping information therein and the number of hops for initiation of the synchronous control indicates a hopping synchronization at the next hopping, each of said radio terminals performs the hopping from the leading frequency of the inherent hopping pattern when a time corresponding to the difference between the hopping interval and the synchronous correction time for said corresponding base-station device has elapsed from the head of the next hopping.

18. A base-station device for use in a wireless LAN system having a plurality of cells each comprising one or more radio terminals serving under the base-station device, the base-station device comprising:

means for assigning inherent hopping patterns to said cell to which the base-station device belongs;

means for generating a cue for providing synchronization between the base-station device and other base-station device in different cells by using a hopping timing;

synchronism control means for enabling communications between the base-station device and the other base-station devices in accordance with the cue generated by said means for generating the cue to thereby provide hopping synchronization between the base-station device and the other base-station device;

wherein said base-station device further comprises means for communicating with said other base-station devices to divide said respective base-station devices in said plurality of cells into a single master base-station device and at least one slave base-station device;

wherein if said base-station device is said master base-station device, said synchronism control means provides the hopping synchronization between said base-station device and said one or more radio terminals serving under said base-station device in accordance with the cue generated by said means for generating the cue and notifies a hopping synchronous request to said at least one slave base-station device; and wherein if said base-station device is said at least one slave base-station device, said synchronism control means provides the hopping synchronization between said base-station device and said one or more radio terminals serving under said base-station device in response to the hopping synchronous request notified from said master base-station device.

19. A base-station device according to claim 18, wherein said synchronism control means of said master base-station device measures a time that elapsed before the occurrence of the next hopping timing of said master base-station device in accordance with the cue generated by said means for generating the cue and sets it as a synchronous correction time for said master base-station device, and when a time corresponding to the difference between the hopping interval and the synchronous correction time has elapsed after completion of a predetermined number of hops for initiation of synchronous control, said synchronism control means performs hopping from the leading frequency of the inherent hopping pattern for said corresponding cell to which said master base-station device belongs.

20. A base-station device according to claim 19, wherein said synchronism control means send hopping information, including the synchronous correction time and the number of hops for initiation of the synchronous control to said one or more radio terminals in said cell to which said master base-station device belongs, a plural number of times.

21. A base-station device according to claim 18, wherein said synchronism control means of said slave base-station device measures a time that elapsed before the occurrence of the next hopping timing for said slave base-station device in response to the hopping synchronous request notified from said master base-station device and sets it as a synchronous correction time, and when a time corresponding to the difference between the hopping interval and the synchronous correction time has elapsed after completion of a predetermined number of hops for initiation of synchronous control, said synchronism control means performs the hopping from the leading frequency of the inherent hopping pattern for said corresponding cell to which said slave base-station device belongs.

22. A base-station device according to claim 21, wherein said synchronism control means sends hopping information, including the synchronous correction time and the number of hops for initiation of the synchronous control to said one or more radio terminals in said cell to which said slave base-station device belongs, a plural number of times.

23. A method of controlling base-station devices in a wireless LAN system having a plurality of cells each comprising the base-station device and one or more radio terminals serving under the base-station device and wherein said base-station device and said one or more radio terminals in each cell perform mutual communication using frequency hopping spread spectrum system and each base-station device is mutually connected to another base-station, said method causing said base-station device to perform the steps of:

hopping frequencies at regular intervals in each cell according to a hopping pattern common to said plurality of cells in order of frequencies and shifting from the hopping pattern of other cells;

periodically transmitting a control frame to other base-station devices in the wireless LAN system during operation; and adjusting the hopping timing in response to reception of said control frame transmitted by another base-station device.

24. A method according to claim 23, said method further causing said base-station device to perform the step of adjusting hopping timing by switching the frequency to a next hop after a first period from transmitting said control frame, wherein said adjusting step in response to the reception of the control frame includes the step of switching the frequency to the next hop.

25. A base-station device for use in a wireless LAN system having a plurality of cells each comprising one or more radio terminals serving under said base-station device, wherein the base-station device and said one or more radio terminals in each cell perform mutual communication using frequency hopping spread spectrum system and the base-station device is mutually connected to another base-station, said base-station device comprising:

means for hopping frequencies at regular intervals in each cell according to a hopping pattern common to said plurality of cells in order of frequencies and shifting from the hopping pattern of other cells;

means for periodically transmitting a control frame to other base-station devices in the wireless LAN system during operation; and means for adjusting the hopping timing in response to reception of said control frame transmitted by another base-station device.

26. The base-station device according to claim 25, wherein said means for adjusting the hopping timing includes means for switching the frequency to a next hop after a first period from transmitting said control frame and means for switching the frequency to the next hop upon receiving the control frame.

* * * * *